United States Patent
Parkinson et al.

(10) Patent No.: US 8,977,844 B2
(45) Date of Patent: Mar. 10, 2015

(54) SMARTCARD FORMATION WITH AUTHENTICATION KEYS

(75) Inventors: Steven William Parkinson, Mountain View, CA (US); Robert B. Lord, Mountain View, CA (US)

(73) Assignee: Red Hat, Inc., Raleigh, NC (US)

(*) Notice: Subject to any disclaimer, the term of this patent is extended or adjusted under 35 U.S.C. 154(b) by 1230 days.

(21) Appl. No.: 11/469,480

(22) Filed: Aug. 31, 2006

(65) Prior Publication Data
US 2008/0059790 A1    Mar. 6, 2008

(51) Int. Cl.
*H04L 1/00* (2006.01)
*H04L 29/06* (2006.01)

(52) U.S. Cl.
CPC .................... *H04L 63/0853* (2013.01)
USPC ........... 713/155; 713/168; 713/169; 713/170; 713/171; 713/172; 713/173; 713/174; 713/182; 713/183; 713/184; 713/185; 713/186; 726/1; 726/9; 726/16; 726/17; 726/18; 726/19; 726/20; 709/225; 709/229

(58) Field of Classification Search
CPC .............. H04L 1/0028; G06F 2205/003
USPC .............. 713/202, 168–174, 182–186, 159; 709/229, 225; 726/16–20, 9, 1–2; 705/65–66
See application file for complete search history.

(56) References Cited

U.S. PATENT DOCUMENTS

| | | |
|---|---|---|
| 4,108,367 A | 8/1978 | Hannan |
| 4,849,614 A | 7/1989 | Watanabe et al. |
| 4,924,330 A * | 5/1990 | Seamons et al. ............... 360/66 |
| 5,247,163 A | 9/1993 | Ohno et al. |
| 5,355,414 A | 10/1994 | Hale et al. |
| 5,499,371 A | 3/1996 | Henninger et al. |
| 5,594,227 A | 1/1997 | Deo |
| 5,631,961 A | 5/1997 | Mills et al. |
| 5,666,415 A | 9/1997 | Kaufman |
| 5,721,781 A | 2/1998 | Deo et al. |
| 5,745,576 A | 4/1998 | Abraham et al. |
| 5,745,678 A | 4/1998 | Herzberg et al. |
| 5,768,373 A | 6/1998 | Lohstroh et al. |
| 5,862,310 A * | 1/1999 | Crawford et al. ............ 358/1.18 |
| 5,923,884 A | 7/1999 | Peyret et al. |
| 5,937,066 A | 8/1999 | Gennaro et al. |
| 5,943,423 A | 8/1999 | Muftic |
| 5,991,411 A | 11/1999 | Kaufman et al. |

(Continued)

FOREIGN PATENT DOCUMENTS

| | | |
|---|---|---|
| WO | 9724831 | 7/1997 |
| WO | 0048064 A1 | 8/2000 |
| WO | 2007096590 A1 | 8/2007 |

OTHER PUBLICATIONS

Schneier, Bruce, Applied Cryptography, Second Edition, 1996 John Wiley and Sons, pp. 480-481.

(Continued)

*Primary Examiner* — Taghi Arani
*Assistant Examiner* — Josnel Jeudy
(74) *Attorney, Agent, or Firm* — Lowenstein Sandler LLP

(57) ABSTRACT

An embodiment generally relates to a method of managing tokens. The method includes detecting a presence of a token at a client and determining a status of the token. The method also includes formatting the token at the client in response to the status of the token being unformatted.

20 Claims, 4 Drawing Sheets

(56) References Cited

U.S. PATENT DOCUMENTS

| | | |
|---|---|---|
| 5,991,882 A | 11/1999 | O'Connell |
| 6,005,942 A | 12/1999 | Chan et al. |
| 6,005,945 A | 12/1999 | Whitehouse |
| 6,011,847 A | 1/2000 | Follendore, III |
| 6,016,476 A | 1/2000 | Maes et al. |
| 6,044,155 A | 3/2000 | Thomlinson et al. |
| 6,072,876 A | 6/2000 | Obata et al. |
| 6,141,420 A | 10/2000 | Vanstone et al. |
| 6,178,507 B1 | 1/2001 | Vanstone |
| 6,179,205 B1 | 1/2001 | Sloan |
| 6,226,744 B1 | 5/2001 | Murphy et al. |
| 6,377,825 B1 | 4/2002 | Kennedy et al. |
| 6,490,680 B1 | 12/2002 | Scheidt et al. |
| 6,502,108 B1 | 12/2002 | Day et al. |
| 6,539,093 B1 | 3/2003 | Asad et al. |
| 6,636,975 B1 | 10/2003 | Khidekel et al. |
| 6,643,701 B1 | 11/2003 | Aziz et al. |
| 6,687,190 B2 | 2/2004 | Momich et al. |
| 6,691,137 B1 | 2/2004 | Kishi |
| 6,698,654 B1 | 3/2004 | Zuppicich |
| 6,718,319 B1 * | 4/2004 | Fisher et al. ............... 1/1 |
| 6,734,886 B1 | 5/2004 | Hagan et al. |
| 6,760,752 B1 | 7/2004 | Liu et al. |
| 6,804,687 B2 | 10/2004 | Sampson |
| 6,819,766 B1 | 11/2004 | Weidong |
| 6,826,686 B1 | 11/2004 | Peyravian |
| 6,829,712 B1 | 12/2004 | Madoukh |
| 6,880,037 B2 | 4/2005 | Boyer |
| 6,880,084 B1 | 4/2005 | Brittenham et al. |
| 6,898,605 B2 | 5/2005 | Constantino |
| 6,898,714 B1 | 5/2005 | Nadalin et al. |
| 6,931,133 B2 | 8/2005 | Andrews et al. |
| 6,941,326 B2 | 9/2005 | Kadyk et al. |
| 6,970,970 B2 | 11/2005 | Jung et al. |
| 6,978,933 B2 | 12/2005 | Yap et al. |
| 6,986,040 B1 | 1/2006 | Kramer et al. |
| 7,007,105 B1 | 2/2006 | Sullivan et al. |
| 7,010,600 B1 | 3/2006 | Prasad et al. |
| 7,050,589 B2 | 5/2006 | Kwan |
| 7,051,213 B1 | 5/2006 | Kobayashi et al. |
| 7,085,386 B2 | 8/2006 | Audebert et al. |
| 7,114,028 B1 * | 9/2006 | Green et al. ............ 711/111 |
| 7,156,302 B2 | 1/2007 | Yap et al. |
| 7,159,763 B2 | 1/2007 | Yap et al. |
| 7,185,018 B2 | 2/2007 | Archbold et al. |
| 7,251,728 B2 | 7/2007 | Toh et al. |
| 7,278,581 B2 | 10/2007 | Ong |
| 7,299,364 B2 | 11/2007 | Noble et al. |
| 7,302,585 B1 | 11/2007 | Proudler et al. |
| 7,356,688 B1 | 4/2008 | Wang |
| 7,374,099 B2 | 5/2008 | de Jong |
| 7,386,705 B2 | 6/2008 | Low et al. |
| 7,437,757 B2 * | 10/2008 | Holdsworth ............... 726/9 |
| 7,451,921 B2 | 11/2008 | Dowling et al. |
| 7,475,250 B2 | 1/2009 | Aull et al. |
| 7,475,256 B2 | 1/2009 | Cook |
| 7,480,384 B2 | 1/2009 | Peyravian et al. |
| 7,502,793 B2 | 3/2009 | Snible et al. |
| 7,571,321 B2 | 8/2009 | Appenzeller et al. |
| 7,602,910 B2 | 10/2009 | Johansson et al. |
| 7,702,917 B2 | 4/2010 | Tevosyan et al. |
| 7,769,996 B2 | 8/2010 | Randle et al. |
| 7,822,209 B2 | 10/2010 | Fu et al. |
| 7,860,243 B2 | 12/2010 | Zheng et al. |
| 7,894,606 B2 * | 2/2011 | Eastham ............... 380/278 |
| 2001/0008012 A1 | 7/2001 | Kausik |
| 2001/0036276 A1 | 11/2001 | Ober et al. |
| 2001/0054148 A1 | 12/2001 | Hoornaert et al. |
| 2002/0004816 A1 | 1/2002 | Vange et al. |
| 2002/0007351 A1 | 1/2002 | Hillegass et al. |
| 2002/0007359 A1 | 1/2002 | Nguyen |
| 2002/0010679 A1 | 1/2002 | Felsher |
| 2002/0029343 A1 | 3/2002 | Kurita |
| 2002/0056044 A1 | 5/2002 | Andersson |
| 2002/0059144 A1 | 5/2002 | Meffert et al. |
| 2002/0064095 A1 | 5/2002 | Momich et al. |
| 2002/0080958 A1 | 6/2002 | Ober et al. |
| 2002/0099727 A1 | 7/2002 | Kadyk et al. |
| 2002/0112156 A1 | 8/2002 | Glen et al. |
| 2002/0120842 A1 | 8/2002 | Bragstad et al. |
| 2002/0133707 A1 | 9/2002 | Newcombe |
| 2002/0171546 A1 | 11/2002 | Evans et al. |
| 2002/0184149 A1 | 12/2002 | Jones |
| 2002/0188848 A1 | 12/2002 | Buttiker |
| 2003/0005291 A1 | 1/2003 | Burn |
| 2003/0012386 A1 | 1/2003 | Kim et al. |
| 2003/0028664 A1 | 2/2003 | Tan et al. |
| 2003/0035548 A1 | 2/2003 | Kwan |
| 2003/0056099 A1 | 3/2003 | Asanoma et al. |
| 2003/0075610 A1 | 4/2003 | Ong |
| 2003/0093695 A1 | 5/2003 | Dutta |
| 2003/0115455 A1 | 6/2003 | Aull et al. |
| 2003/0115466 A1 | 6/2003 | Aull et al. |
| 2003/0115467 A1 | 6/2003 | Aull et al. |
| 2003/0115468 A1 | 6/2003 | Aull et al. |
| 2003/0142354 A1 * | 7/2003 | Matsuo et al. ............ 358/1.16 |
| 2003/0167399 A1 | 9/2003 | Audebert et al. |
| 2003/0172034 A1 | 9/2003 | Schneck et al. |
| 2004/0042620 A1 | 3/2004 | Andrews et al. |
| 2004/0053642 A1 | 3/2004 | Sandberg et al. |
| 2004/0066274 A1 | 4/2004 | Bailey |
| 2004/0088562 A1 | 5/2004 | Vassilev et al. |
| 2004/0096055 A1 | 5/2004 | Williams et al. |
| 2004/0103324 A1 | 5/2004 | Band |
| 2004/0103325 A1 | 5/2004 | Priebatsch |
| 2004/0120525 A1 | 6/2004 | Miskimmin et al. |
| 2004/0144840 A1 | 7/2004 | Lee et al. |
| 2004/0146163 A1 | 7/2004 | Asokan et al. |
| 2004/0153451 A1 | 8/2004 | Phillips et al. |
| 2004/0162786 A1 | 8/2004 | Cross et al. |
| 2004/0230831 A1 * | 11/2004 | Spelman et al. ............ 713/201 |
| 2005/0022123 A1 | 1/2005 | Constantino |
| 2005/0033703 A1 | 2/2005 | Holdsworth |
| 2005/0109841 A1 | 5/2005 | Ryan et al. |
| 2005/0114673 A1 | 5/2005 | Raikar et al. |
| 2005/0119978 A1 | 6/2005 | Ates |
| 2005/0123142 A1 * | 6/2005 | Freeman et al. ............ 380/277 |
| 2005/0138386 A1 | 6/2005 | Le Saint |
| 2005/0138390 A1 | 6/2005 | Adams et al. |
| 2005/0144312 A1 | 6/2005 | Kadyk et al. |
| 2005/0184163 A1 | 8/2005 | de Jong |
| 2005/0184164 A1 | 8/2005 | de Jong |
| 2005/0184165 A1 | 8/2005 | de Jong |
| 2005/0188360 A1 | 8/2005 | de Jong |
| 2005/0216732 A1 | 9/2005 | Kipnis et al. |
| 2005/0262361 A1 | 11/2005 | Thibadeau |
| 2005/0279827 A1 | 12/2005 | Mascavage et al. |
| 2005/0289652 A1 | 12/2005 | Sharma et al. |
| 2006/0005028 A1 | 1/2006 | Labaton |
| 2006/0010325 A1 | 1/2006 | Liu et al. |
| 2006/0015933 A1 | 1/2006 | Ballinger et al. |
| 2006/0036868 A1 | 2/2006 | Cicchitto |
| 2006/0043164 A1 | 3/2006 | Dowling et al. |
| 2006/0072747 A1 | 4/2006 | Wood et al. |
| 2006/0073812 A1 | 4/2006 | Punaganti Venkata et al. |
| 2006/0075133 A1 | 4/2006 | Kakivaya et al. |
| 2006/0075486 A1 | 4/2006 | Lin et al. |
| 2006/0101111 A1 | 5/2006 | Bouse et al. |
| 2006/0101506 A1 | 5/2006 | Gallo et al. |
| 2006/0173848 A1 | 8/2006 | Peterson et al. |
| 2006/0174104 A1 | 8/2006 | Crichton et al. |
| 2006/0206932 A1 | 9/2006 | Chong |
| 2006/0208066 A1 | 9/2006 | Finn et al. |
| 2006/0226243 A1 | 10/2006 | Dariel |
| 2006/0291664 A1 | 12/2006 | Suarez et al. |
| 2006/0294583 A1 | 12/2006 | Cowburn et al. |
| 2007/0014416 A1 | 1/2007 | Rivera et al. |
| 2007/0074034 A1 | 3/2007 | Adams et al. |
| 2007/0112721 A1 | 5/2007 | Archbold et al. |
| 2007/0113267 A1 | 5/2007 | Iwanski et al. |
| 2007/0113271 A1 | 5/2007 | Pleunis |
| 2007/0118891 A1 | 5/2007 | Buer |
| 2007/0162967 A1 | 7/2007 | de Jong et al. |
| 2007/0169084 A1 * | 7/2007 | Frank et al. ............ 717/168 |

(56) References Cited

U.S. PATENT DOCUMENTS

| | | |
|---|---|---|
| 2007/0189534 A1 | 8/2007 | Wood et al. |
| 2007/0204333 A1 | 8/2007 | Lear et al. |
| 2007/0230706 A1 | 10/2007 | Youn |
| 2007/0271601 A1 | 11/2007 | Pomerantz |
| 2007/0277032 A1 | 11/2007 | Relyea |
| 2007/0280483 A1 | 12/2007 | Fu |
| 2007/0282881 A1 | 12/2007 | Relyea |
| 2007/0283163 A1 | 12/2007 | Relyea |
| 2007/0283427 A1 | 12/2007 | Gupta et al. |
| 2007/0288745 A1 | 12/2007 | Kwan |
| 2007/0288747 A1 | 12/2007 | Kwan |
| 2008/0005339 A1 | 1/2008 | Kwan |
| 2008/0019526 A1 | 1/2008 | Fu |
| 2008/0022086 A1 | 1/2008 | Ho |
| 2008/0022088 A1 | 1/2008 | Fu et al. |
| 2008/0022121 A1 | 1/2008 | Fu et al. |
| 2008/0022122 A1 | 1/2008 | Parkinson et al. |
| 2008/0022128 A1 | 1/2008 | Proudler et al. |
| 2008/0034216 A1 | 2/2008 | Law |
| 2008/0046982 A1 | 2/2008 | Parkinson |
| 2008/0056496 A1 | 3/2008 | Parkinson |
| 2008/0059793 A1 | 3/2008 | Lord et al. |
| 2008/0069338 A1 | 3/2008 | Relyea |
| 2008/0069341 A1 | 3/2008 | Relyea |
| 2008/0072283 A1 | 3/2008 | Relyea |
| 2008/0077794 A1 | 3/2008 | Arnold et al. |
| 2008/0077803 A1 | 3/2008 | Leach et al. |
| 2008/0133514 A1 | 6/2008 | Relyea |
| 2008/0148047 A1 | 6/2008 | Appenzeller et al. |
| 2008/0189543 A1 | 8/2008 | Parkinson |
| 2008/0209224 A1 | 8/2008 | Lord |
| 2008/0209225 A1 | 8/2008 | Lord |
| 2008/0229401 A1 | 9/2008 | Magne |
| 2009/0003608 A1 | 1/2009 | Lee et al. |
| 2009/0133107 A1 | 5/2009 | Thoursie |
| 2010/0313027 A1 | 12/2010 | Taylor |
| 2012/0331518 A1* | 12/2012 | Lee .................................. 726/1 |

OTHER PUBLICATIONS

Balfanz (Dirk ABalfanz, "Access Control for Ad-Hoc Collaboration", Princeton University Jan. 2001).

"ATM and Credit Card Notification", Feb. 2005 (internet archive) pp. 1-2, www.thereareplaces.com/infgdes/money.atmnotif.htm.

"AMD Announces Specification for Open Platform Management Architecture", Feb. 28, 2005, pp. 1-2, http://www.thefreelibrary.com/AMD+Announces+Specification+for+Open+Platform+Management+Architecture-a0129342307.

Bellvin and Merritt, "Augmented Encrypted Key Exchange: a Password-Based Protocol Secure Against Dictionary Attacks and Password File Compromise", Proceedings of the 1st ACM Conference on Computer and Communications Security, Nov. 1993.

Schneier, "Applied Cryptography: Protocols, Algorithms, and Source Code in C", 1996, John Wiley & Sons, Inc., Second Edition, pp. 455-456.

Zuccherato, Robert, "Elliptic Curve Cryptography Support in Entrust", May 9, 2000.

Red Hat Certificate System, http://www.redhat.com/f/pdf/rhas/DirSecProductSheetCertificateSystem.pdf, Jun. 2005.

PKCS#11 v2.20: Cryptographic Token Interface Standard, RSA Laboratories, Jun. 28, 2004, (see, e.g. Chapter 10, Objects) (see www.rsasecurity.com, 407 pgs).

Cryptography Message Syntax, R. Housely, Request for Comments (RFC) 2630, Network Working Group, The Internet Society, Jun. 1999.

* cited by examiner

SMARTCARD FORMATION WITH AUTHENTICATION KEYS

FIELD

This invention relates generally to tokens, more particularly, to methods, apparatus, and systems for fabricating smartcards.

DESCRIPTION OF THE RELATED ART

Smart cards are storage devices with components to facilitate communication with a reader or coupler. They have file system configurations and the ability to be partitioned into public and private spaces that can be made available or locked. They also have segregated areas for protected information, such as certificates, e-purses, and entire operating systems. In addition to traditional data storage states, such as read-only and read/write, some vendors are working with sub-states best described as "add only" and "update only."

Smart cards are a way to increase security especially for enterprise systems. Enterprise system often contain valuable information such as financial data, personnel records, strategies, etc., that may be critical for the entity administrating the enterprise system. Moreover, for at least the reasons described above, smart cards may offer a mechanism to control access to data within the enterprise systems. Accordingly, the reasons to use smart card are plentiful.

An information technology administrator may be charged with providing these smart cards for an enterprise. The administrator typically searches for a vendor to provide the smart cards and then work with the vendor to receive preformatted smart cards. This process may involve a significant resources. e.g., time, man-hours, etc., to accomplish. Another conventional method of obtaining formatted smart cards is for the administrator to purchase a device that formats the smart cards. These devices are expensive and may not be have a high return on investment for a small number of employees. Accordingly, there is a need for a mechanism to format smart cards without incurring a significant cost.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Embodiments generally relate to systems, apparatus, and methods for formatting tokens, such as smartcards. More specifically, a factory module in an enterprise security system may be configured to format the tokens. The factory module may be configured to detect the presence of a generic, uncustomized smartcard in a smartcard reader associated with a client. The factory module may then customize the generic smartcard according to the requirements for a specified enterprise using the smartcard reader. Accordingly, a security officer does not need to order customized smartcards from a third pary manufacturer.

For simplicity and illustrative purposes, the principles of the present invention are described by referring mainly to exemplary embodiments thereof. However, one of ordinary skill in the art would readily recognize that the same principles are equally applicable to, and can be implemented in, all types of secure computing systems, and that any such variations do not depart from the true spirit and scope of the present invention. Moreover, ill the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Figure 1:
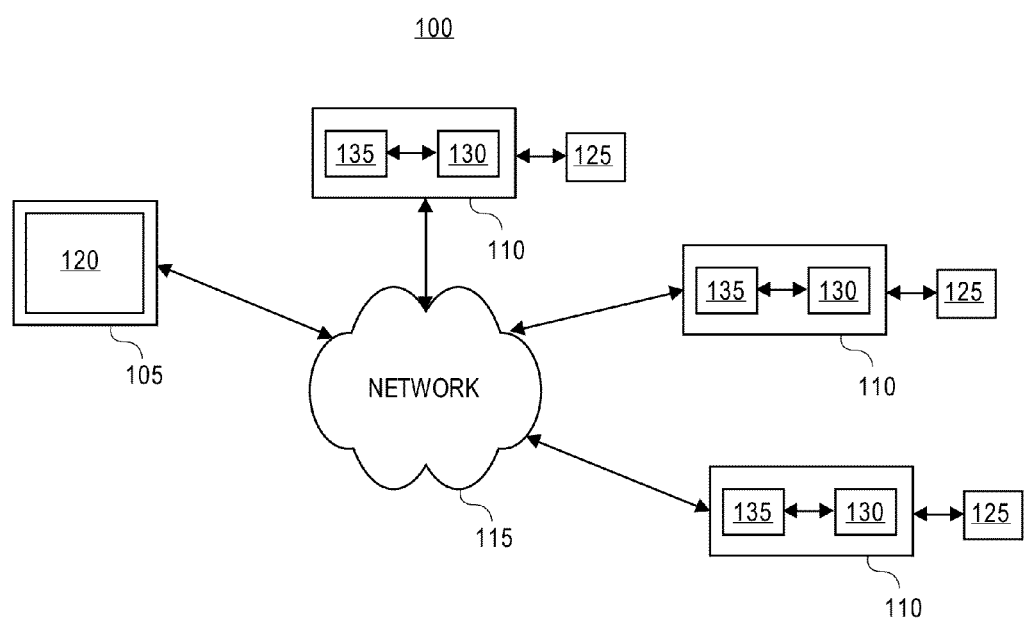
FIG. 1 illustrates an exemplary system in accordance with an embodiment.

FIG. 1 illustrates an exemplary secure system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the secure system 100 includes a server 105, clients 110 and a local network 115. The server 105 may be a computing machine or platform configured to execute a token management system 120 through a multiple user operating system (not shown) in conjunction with the clients 110. For example, in order to assist in the formatting and customization of a token or smartcard, server 105 may maintain a database having information relating to: a serial number for each token or smartcard; a date that each token or smartcard was formatted and customized; an applet version installed on each token or smartcard; and a secure channel key identifier. The server 105 may be implemented with server platforms as known to those skilled in the art from Intel, Advanced Micro Devices, Hewlett-Packard, Dell, etc.

The server 105 may interact with the clients over the local network 115. The local network 115 may be a local area network implementing an established network protocol such as Ethernet, token ring, FDDI, etc. The local network 115 provides a communication channel for the server 105 and clients 10 to exchange data and commands.

The clients 110 may be computing machine or platform configured to execute secure and open applications through the multi-user operating system. The clients 110 may be implemented with personal computers, workstations, thin clients, thick clients, or other similar computing platform. The clients 110 may use operating systems such as Linux, Windows, Macintosh or other available operating system.

Each client 110 may be configured to interface with a security device 125. The security device 125 may be configured to act as a gatekeeper to the client 10. More particularly, a user may use a security token, such as a smart card, to access the respective client 110. Each client 110 may have a security client 130 executing to monitor the security device 125.

The security client 130 may be configured to manage the token. More specifically, the security client 130 may enroll the token, recover keys for the token or reset a personal identification number for the token. The security client 130 may also be configured to interface with the token management system 120 and act as a proxy for application program data units (APDUs) between the token management system 120 and the token. The security client 130 may be further configured to display user interfaces as the token management system 120 directs, i.e., prompting the user for credentials and/or PIN, displaying token status.

Figure 2:
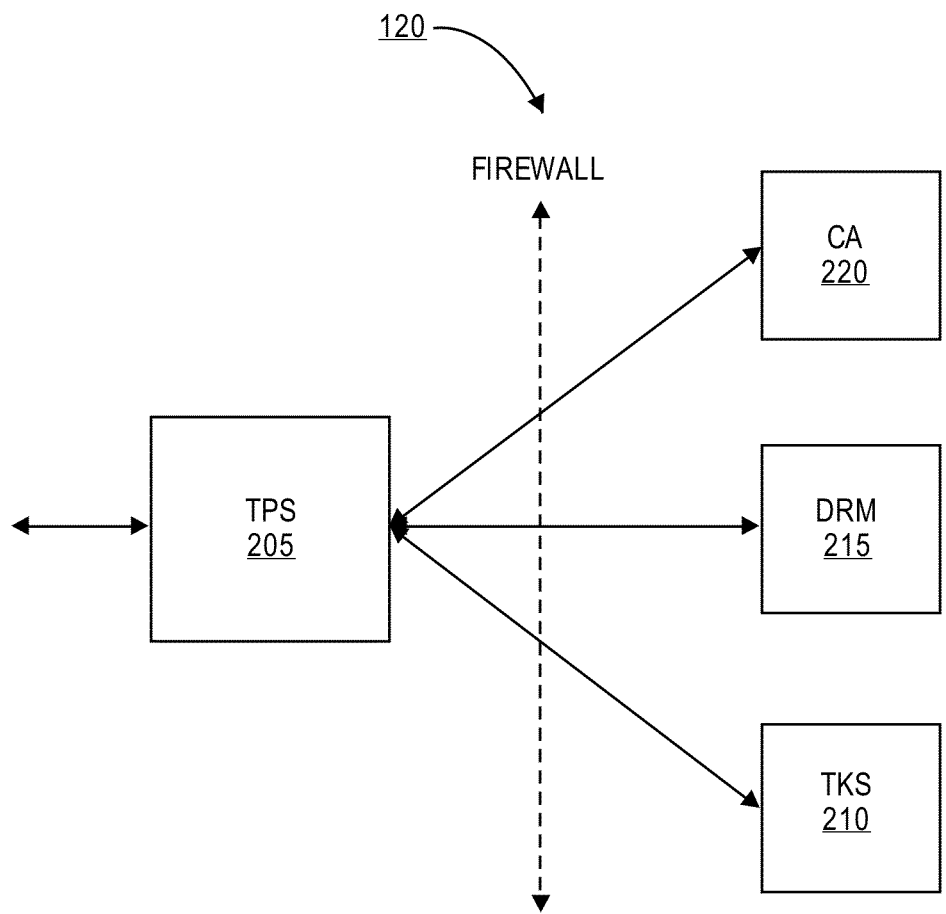
FIG. 2 illustrates an exemplary token management system in accordance with another embodiment.

The token management system 120 comprises several modules, as depicted in FIG. 2. FIG. 2 shows an exemplary architecture of the token management system 120 in accordance with another embodiment. It should be readily apparent to those of ordinary skill in the art that the token management system 120 depicted in FIG. 2 represents a generalized schematic illustration and that other components may be added or existing components may be removed or modified. Moreover, the token management system 120 may be implemented using software components, hardware components, or combinations thereof.

As shown in FIG. 2, the token management system 120 includes a token processing system (labeled as TPS in FIG. 2) 205, a token key service (TKS) module 210, a data recovery manager (DRM) module 215 and a certificate authority (CA) module 220. The TPS 205 may be configured to act as a registration authority. The TPS 205 may direct the enrollment process. The TPS 205 may also be configured to act as a gateway between security clients 130 and tokens and the modules of the token management system 120.

The TKS module 210 may be configured to maintain master keys for the tokens. The TKS module 210 may also store symmetric keys associated with the token. These keys may be derived from a single master key combined with smart card serial number or identification number, i.e., the CID. The manufacturer of the smart card may store these symmetric keys onto the token. The manufacturer may also forward the single master key to the administrator of the token management system 120, who installs the key into the TKS module 210.

The DRM module 215 may be configured to maintain a database of encrypted subject's private keys, which can be recovered oil demand by an appropriate process.

The CA module 220 may be configured to generate X.509 certificates in response to received subject public key information and certificate enrollment requests.

Returning to FIG. 1, the client 110 may also execute a factory module 135. The factory module 135 may be configured to interface with the security client 130. In some embodiments, the factory module 135 may be invoiced as a menu option or a command line prompt. In other embodiments, the factory module 135 may execute in the background until an unformatted token is detected in the security device 125.

Once invoked the factory module 135 may gather the information necessary to format the smart card so that it is customized to an enterprise. For example, formatting may comprise installing applets onto the smartcard, creating security domains, creating applet instances, creating a data area that is read when the smartcard is first inserted by a user (which would then initiate a further personalization or customization phase), and replacing "answer to reset" (or "ATR") codes with a new code that is allocated by the enterprise. Formatting may also comprise replacing the cryptographic authentication keys or encryption keys with new ones which are specific to an enterprise. Formatting may also include information such as shared users lists, group assignments, access lists, etc. The factory module 135 may then use the security device 125 to format and customize the inserted token in accordance to the gathered format information. Accordingly, an administrator can purchase generic unformatted smart cards and format in-house without incurring a large cost for a smart card formatter.

Figure 3:
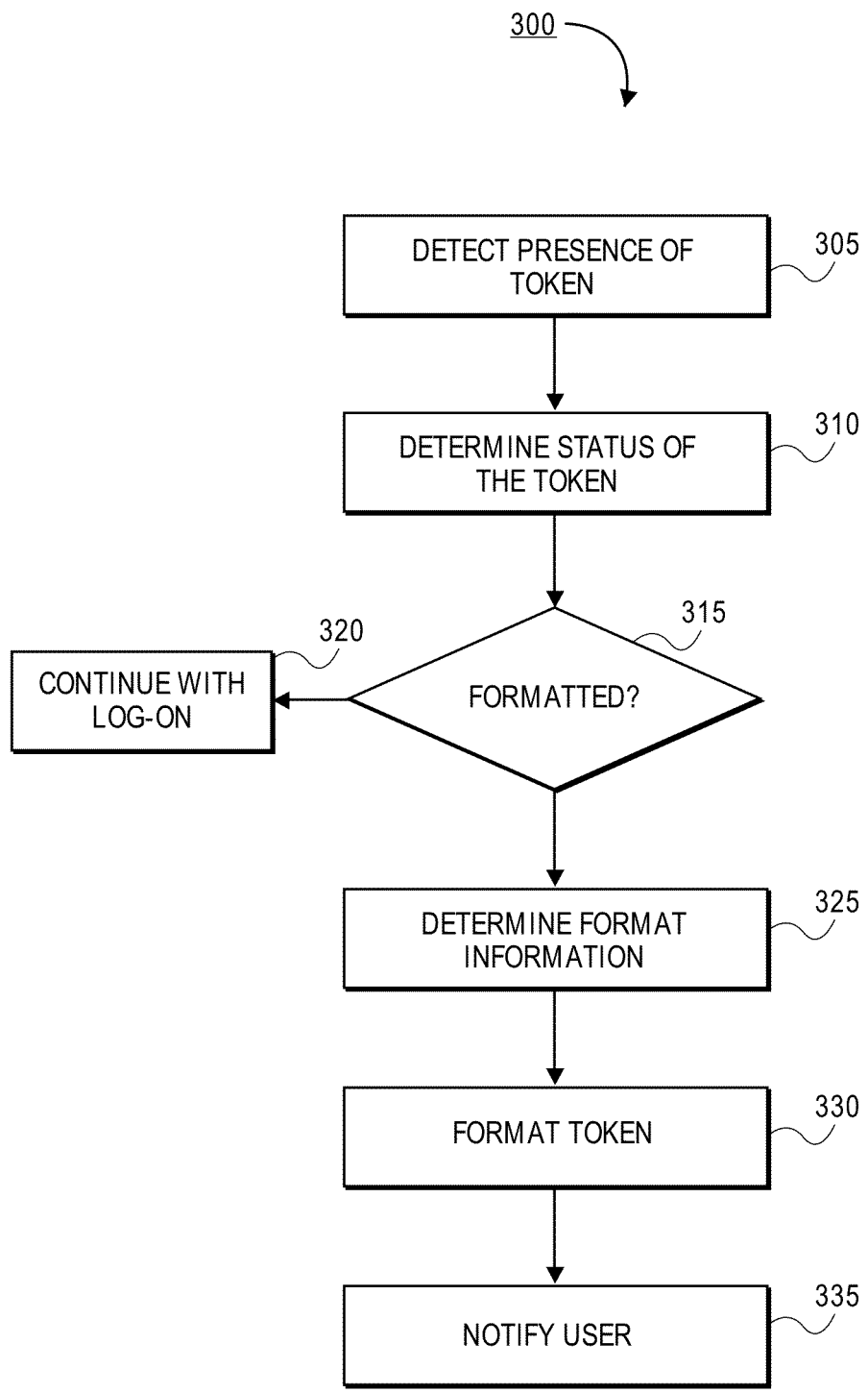
FIG. 3 illustrates an exemplary flow diagram in accordance with yet another embodiment.

FIG. 3 illustrates an exemplary flow diagram 300 in accordance with an embodiment. It should be readily apparent to those of ordinary skill in the art that the flow diagram 300 depicted in FIG. 3 represents a generalized schematic illustration and that other steps may be added or existing steps may be removed or modified.

As shown in FIG. 3, in step 305, the factory module 135 may detect the presence of a token, in step 305. More particularly, the security client 130 may pass a notification to the factory module 305 of the presence of the token. The security client 130 may also pass tile status of the token to the factory module 130, in step 310.

If the factory module 135 determines that the status is formatted, in step 315, the factory module 135 may allow the log-on process continue with the security client 130, in step 320. Otherwise, if the factory module 135 determines that the status of the token is unformatted, the factory module 135 may be configured to determine format information for the token. For example, the factory module 135 may signal the security client 130 requesting information of the intended user such as access lists, group access, file access, etc.

In step 330, the factory module 135 may be configured to format the token using the security device 125. One the format process is completed, the factory module 135 may notify the completion of the formatting of the token.

Figure 4:
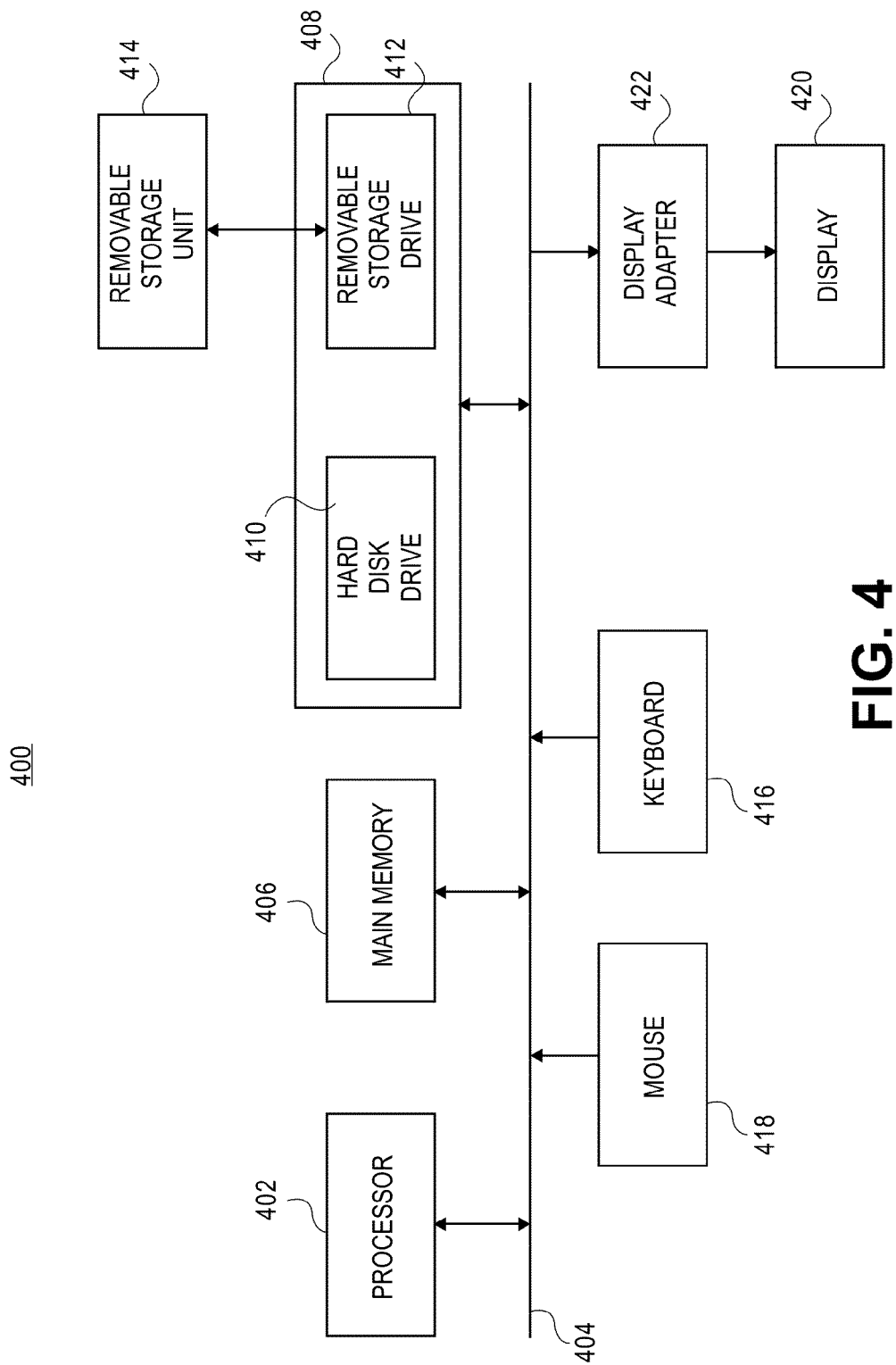
FIG. 4 illustrates an exemplary computing platform.

FIG. 4 illustrates an exemplary block diagram of a computing platform 400 where an embodiment may be practiced. The functions of the security client and token management system may be implemented in program code and executed by the computing platform 400. The security client and token management system may be implemented in computer languages such as PASCAL, C, C++, JAVA, etc.

As shown in FIG. 4, the computer system 400 includes one or more processors, such as processor 402 that provide an execution platform for embodiments of the security client and token management system. Commands and data from the processor 402 are communicated over a communication bus 404. The computer system 400 also includes a main memory 406, such as a Random Access Memory (RAM), where the security client and token management system may be executed during runtime, and a secondary memory 408. The secondary memory 408 includes, for example, a hard disk drive 410 and/or a removable storage drive 412, representing a floppy diskette drive, a magnetic tape drive, a compact disk drive, etc., where a copy of a computer program embodiment for the security client and token management system may be stored. The removable storage drive 412 reads from and/or writes to a removable storage unit 414 in a well-known manner. A user interfaces with the security client and token management system with a keyboard 416, a mouse 418, and a display 420. A display adapter 422 interfaces with the communication bus 404 and die display 420. The display adapter also receives display data from the processor 402 and converts the display data into display commands for the display 420.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general, While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
   detecting a security token device that is un-formatted with respect to an enterprise, wherein the security token device comprises a first cryptographic authentication key and a first answer-to-reset (ATR) code; and
   formatting, by a processor, the security token device by:
      replacing the first ATR code of the security token device with a second ATR code that is allocated to the enterprise, and
      replacing the first cryptographic authentication key of the security token device with a second cryptographic authentication key that is specific to a security requirement of the enterprise.

2. The method of claim 1, further comprising:
   determining format information for the security token device; and
   embedding the format information on the security token device.

3. The method of claim 1, further comprising providing a notification of a completion of the formatting of the security token device.

4. An apparatus comprising:
   a memory to contain instructions; and
   a processor, coupled to the memory, to execute the instructions to:
      detect a security token device that is un-formatted with respect to an enterprise, wherein the security token device comprises a first cryptographic authentication key and a first answer-to-reset (ATR) code; and
      format the security token device by:
         replacing the first ATR code of the security token device with a second ATR code that is allocated to the enterprise, and
         replacing the first cryptographic authentication key of the security token device with a cryptographic authentication key that is specific to a second security requirement of the enterprise.

5. A non-transitory computer-readable storage medium comprising computer-executable instructions encoded thereon which, when executed by a processor, perform operations comprising:
   detecting a security token device that is un-formatted with respect to an enterprise, wherein the security token device comprises a first cryptographic authentication key and a first answer-to-reset (ATR) code; and
   formatting, by the processor, the security token device by:
      replacing the first ATR code of the security token device with a second ATR code that is allocated to the enterprise, and
      replacing the first cryptographic authentication key of the security token device with a cryptographic authentication key that is specific to a second security requirement of the enterprise.

6. A system comprising:
   a server, associated with an enterprise, comprising a processor to:
      manage and maintain security token devices, wherein the server is communicatively coupled to a client;
      detect a security token device that is un-formatted with respect to the enterprise, wherein the security token device comprises a first cryptographic authentication key and a first answer-to-reset (ATR) code;
      receive, from the client, a request to format the security token device; and
      in response to receiving the request from the client, cause the client to:
         replace the first ATR code of the security token device with a second ATR code that is allocated to the enterprise, and
         replace the first cryptographic authentication key of the security token device with a cryptographic authentication key that is specific to a second security requirement of the enterprise.

7. The system of claim 6, wherein the processor is further to determine format information for the security token device and write the format information on the security token device.

8. The system of claim 6, wherein the processor is further to provide a notification of a completion of the formatting of the security token device.

9. An apparatus comprising:
   a processor;
   an interface adapted to couple with a security token device; and
   a factory module executable by the processor to communicate with the security token device via the interface, wherein the factory module is to:
      determine whether the security token device is un-formatted with respect to an enterprise, wherein the security token device comprises a first cryptographic authentication key and a first answer-to-reset (ATR) code, and
      in response to a determination that the security token device is un-formatted with respect to the enterprise, format the security token device by:
         replacing the first ATR code of the security token device with a second ATR code that is allocated to the enterprise, and
   replacing the first cryptographic authentication key of the security token device with a cryptographic authentication key that is specific to a second security requirement of the enterprise.

10. The apparatus of claim 9, wherein the factory module is further to determine format information for the security token device and embed the format information on the security token device.

11. The apparatus of claim 9, wherein the factory module is further to provide a notification of a completion of the formatting of the security token device.

12. The method of claim 1, wherein formatting the security token device comprises:
  installing an applet in the security token device.

13. The method of claim 1, wherein formatting the security token device comprises:
  creating a secure domain for the security token device.

14. The method of claim 1, wherein formatting the security token device comprises:
  creating a data area in the security token device for embedding format information.

15. The method of claim 1, wherein formatting the security token device comprises:
  embedding encryption keys associated with the enterprise in the security token device.

16. The method of claim 2, wherein the format information comprises at least one of access lists, group assignments, or shared user lists.

17. The method of claim 1, wherein the security token device is coupled to a client device associated with the enterprise.

18. The apparatus of claim 4, wherein the security token device is coupled to a client device associated with the enterprise.

19. The non-transitory computer-readable storage medium of claim 5, wherein the security token device is coupled to a client device associated with the enterprise.

20. The system of claim 6, wherein the security token device is coupled to a client device associated with the enterprise.

\* \* \* \* \*